US008606325B2

(12) United States Patent
Jung

(10) Patent No.: US 8,606,325 B2
(45) Date of Patent: Dec. 10, 2013

(54) METHOD AND APPARATUS FOR DETERMINING PREFERRED IMAGE FORMAT BETWEEN MOBILE VIDEO TELEPHONES

(75) Inventor: Kyung-Hun Jung, Suwon-si (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 568 days.

(21) Appl. No.: 12/197,360

(22) Filed: Aug. 25, 2008

(65) Prior Publication Data
US 2009/0054102 A1    Feb. 26, 2009

(30) Foreign Application Priority Data

Aug. 23, 2007  (KR) .................. 10-2007-0085172

(51) Int. Cl.
*H04M 1/00* (2006.01)
*H04B 1/38* (2006.01)

(52) U.S. Cl.
USPC ..................................... 455/566; 455/414.4

(58) Field of Classification Search
USPC ............ 455/550.1, 566, 151.1, 151.2, 151.4, 455/412.1, 414.1, 414.3, 414.4, 416; 345/2.3, 1.1, 103; 725/62, 64; 348/14.07, 14.08, 14.1
See application file for complete search history.

(56) References Cited

U.S. PATENT DOCUMENTS

| 6,515,695 B1* | 2/2003 | Sato et al. ................. 348/14.08 |
| 6,792,048 B1* | 9/2004 | Lee et al. ................. 375/240.26 |
| 2001/0034222 A1* | 10/2001 | Roustaei et al. ............. 455/403 |
| 2002/0111134 A1* | 8/2002 | Salurso et al. .............. 455/3.06 |
| 2006/0080407 A1 | 4/2006 | Rengaraju |

FOREIGN PATENT DOCUMENTS

| CN | 1933478 A | 3/2007 | |
| JP | 2002-033953 A | 1/2002 | |
| JP | 2002-281550 A | 9/2002 | |
| JP | 2003-348556 A | 12/2003 | |
| JP | 2004-192140 A | 7/2004 | |
| JP | 2004-193809 A | 7/2004 | |
| JP | 2007-208360 A | 8/2007 | |
| KR | 2006-45198 | 5/2006 | ............. H04L 12/56 |
| KR | 10-706372 | 4/2007 | ............. H04L 12/50 |
| WO | 02/15625 A1 | 2/2002 | |
| WO | 2006/132573 A1 | 12/2006 | |
| WO | 2007/074269 A1 | 7/2007 | |

OTHER PUBLICATIONS

Kutscher, et al.; "Session Description and Capability Negotiation; draft-ietf-mmusic-sdpng-08.txt;" Feb. 20, 2005; vol. mmusic, No. 8; XP015038647.*

(Continued)

*Primary Examiner* — Ping Hsieh
(74) *Attorney, Agent, or Firm* — Cha & Reiter, LLC

(57) ABSTRACT

A method for determining a preferred image format in a User Equipment (UE) supporting a mobile video call between UEs. The UEs should each have a camera and a display Upon receiving, from an opposing UE, video transmission control information including therein a preferred image format. If the preferred image format requested by the opposing UE is acceptable, then the opposing UE is sent video transmission control information is sent including therein at least one of an acceptable response message and an acceptable new preferred image format according to acceptability of the preferred image format requested by the opposing UE.

21 Claims, 5 Drawing Sheets

(56) References Cited

OTHER PUBLICATIONS

Andreasen, F., Cisco Systems; "SDP Capability Negotiation: Requirements and Review of Existing Work; draft-ietf-mmusic-sdp-capability-negotiation-reqts-01.txt;" Mar. 4, 2007; vol. mmusic, No. 1; XP015049591

Rosenberg, J., et al.; "An Offer/Answer Model With the Session Description Protocol (SDP); rfc3264.txt;" Jun. 1, 2002; XP015009042.

Ott, et al.; "RTP Payload Format for ITU-T Rec. H.263 Video; rfc4629.txt;" Jan. 1, 2007; XP015055026.

Handley, M., et al.; "SDP: Session Description Protocol; rfc4566.txt;" Jul. 1, 2006; XP015055003.

* cited by examiner

METHOD AND APPARATUS FOR DETERMINING PREFERRED IMAGE FORMAT BETWEEN MOBILE VIDEO TELEPHONES

CLAIM OF PRIORITY

This application claims the benefit of priority under 35 U.S.C. §119(a) from a Korean Patent Application filed in the Korean Intellectual Property Office on Aug. 23, 2007 and assigned Serial No. 2007-85172, the disclosures of which are incorporated herein by reference in its entirety.

BACKGROUND OF THE INVENTION

1. Field of the Invention

The present invention relates generally to a mobile terminal apparatus and method capable of an Internet Protocol (IP)-based video call service. More particularly, the present invention relates to a method and apparatus for image format determination for determining an image format for exchange between mobile video telephones.

2. Description of the Related Art

Recently, the so-called 'camera phone', designed by adding a camera function to a mobile communication terminal, is becoming increasingly common. The camera phone has developed beyond recording pictures for transfer to a computer via a port or a means for transmitting/receiving video data, transcending the original capability of a mobile communication terminal transmitting/receiving voice and data. Therefore, the video call service is now available, in which users can enjoy not only the voice call but also a video call over the camera phones.

With reference to FIG. 1, herein below is a brief description of an initialization process for a video call between the general IP-based mobile video telephones.

Referring to FIG. 1, a User Equipment 1 (UE1) 101 sends a Session Description Protocol (SDP) invite offer to a UE2 103 via an outbound proxy 102 in steps 110 and 120.

The SDP invite offer is a message including control information for video transmission, such as the number of frames per second, picture quality, image format, etc. The mobile video telephone properly distributes its limited bit rate among image, voice, data and control signals for their transmission based on the Internet Protocol (IP). Of the full bit rate, a bit rate allocation for video transmission is determined by taking into account the number of frames per second, picture quality, image format, etc. Among these items, the number of frames per second and the picture quality can be adjusted even during a video call, but the image format is generally fixed during the call.

Session Initiation Protocol/Session Description Protocol (SIP/SDP) is used for controlling the number of frames per second as well as the picture quality. In this particular case, a UE sends a command 'a=quality:<quality>' indicating information on the number of frames per second and the picture quality to its opposing UE along with the SDP offer of FIG. 1. In the command, '<quality>' has a value ranging from 0 to 10, where 0 corresponds to greatest number of frames per second and the lowest picture quality, and 10 corresponds to the least number of frames per second and the highest picture quality. Then the opposing UE controls the number of frames second and the picture quality according to the <quality> information included in the SDP offer.

The image format includes the number of horizontal and vertical pixels of an image transmitted/received during a video call, and a UE uses the SDP offer to provide information on its desired image format to the opposing UE. An example of the SDP offer is given below.

<SDP offer>
m=video 49154 RTP/AVP 99 100
b=AS:92
a=rtpmap:99 H263-2000/90000
a=fmtp:99 profile=0; level=45
a=rtpmap:100 MP4V-ES/90000
a=fmtp:100 profile-level-id=9; \
config=000001b009000001b50900000100000001200-0845d4c282c2090a28

Regarding the above-SDP offer, a UE requests an opposing UE to select one of an H.263 video encoder (profile=0, level=45) and a MPEG-4 video encoder (profile-level=9) at a bit rate of 92 kbps. In the SDP offer, 'profile' and 'level', which define performances of the video encoders, prescribe the maximum image format available for encoding/decoding, the maximum number of frames per second, the maximum number of processable blocks, etc.

A sending UE commonly encodes transmission data with a maximum image format allowed by the profile and level values. For example, the maximum image format may include SQCIF (128×96), QCIF (176×144), QVGA (320×240), CIF (352×288), VGA (640×480), etc.

Referring back to FIG. 1, in step 130, the UE2 103 analyzes the received SDP offer, and performs an operation corresponding to the analysis result.

A detailed description of the analysis process of step 130 will now be given below with reference to FIG. 2.

Referring to FIG. 2, the UE2 103 checks the received SDP offer in step 210, and determines in step 220 whether the received SDP offer is acceptable. The acceptability is based on the attributes of the equipment. For example, for an image format, the UE2 103 determines if the maximum image format requested by the UE1 101 is an image format that the UE2 103 can accept.

If it is determined in step 220 that it is possible to accept the SDP offer, the UE2 103 initializes its codec in step 230, and sends a response message (200 OK) indicating acceptability of the SDP offer to the UE1 101 via the outbound proxy 102 in step 240 (steps 140 and 150 of FIG. 1).

However, if it is determined in step 220 that it is impossible to accept the SDP offer, for example, if the maximum image format, for example, is greater than or equal to the image format acceptable in the UE2 103, the UE2 103 generates in step 250 a new SDP offer (a type of counter-offer) indicating its acceptable maximum image format and sends it to the UE1 101.

In the above-described process, however, a receiving UE, which has received an image that the sending UE transmitted after encoding, may display the received image on its screen in a format different from the image format used during the encoding. One reason is to permit a customized display that is preferable to the user.

FIG. 3 is a diagram illustrating exemplary screens of two UEs (or mobile video telephones) now in operation.

In FIG. 3, a sending UE has encoded and transmitted an image in QCIF (176×144), but a format in which the image is actually displayed on a screen of a receiving UE has a size of about 240×200. In this particular case, the receiving UE decodes the received image in the encoding format of QCIF (176×144), and then enlarges the decoded image to 240×200, for the following reason. That is, because the receiving UE uses, as its screen, a Liquid Crystal Display (LCD) having a QVGA (320×240) resolution, if it intactly displays the received QCIF (176×144)-encoded image on its screen, the image shown may too small as compared with the size of the particular screen of the UE.

However, in this enlarging process, the following issues are sometimes encountered.

If the sending UE encodes an image in QCIF (176×144) as described above, the receiving UE may have a limitation in maintaining or improving the picture quality when enlarging the QCIF (176×144)-encoded image to 240×200, no matter how high it increases the bit rate.

In addition, this enlarging process should perform interpolation and filtering for every frame, and the interpolation and filtering for the enlarging process requires huge amounts of calculation.

On the contrary, even though a sending UTE encodes and transmits an image in QVGA (320×240) or CIF (352×288) and a receiving UE reduces the transmitted image to match with a 240×200-image format, the receiving UE needs a sub-sampling and performs a filtering process that requires numerous calculations, with as a result, a considerable part of the image information transmitted after undergoing encoding may be lost. In wireless communication, the waste of such frequency resources is very inefficient and can hardly be permit due to the lack of extra resources.

In other words, there is a known problem in the art is in that there is a significant difference between the available size of an LCD of the mobile phone, and the QCIF, QVGA and CIF formats closely connected to the environment of the mobile phone, among the image formats used in the current signal processing system.

The second problem in the art is that it is not possible to utilize the given bit rate in various modes with the method of selecting one of the existing image formats. For example, even though the UE intends to encode an image in a (16:9) wide-screen mode, there is no such formats and if needed, it is necessary to standardize the desired formats individually, raising another problem.

SUMMARY OF THE INVENTION

An aspect of the present invention is to provide a preferred image format determination method and apparatus for correctly delivering a desired image format to an opposing UE while using the intact existing signaling system, thereby encoding an image in its preferred image format making the best use of an allocated bit rate.

According to one exemplary aspect of the present invention, there is provided a method for determining a preferred image format in a User Equipment (UE) supporting a mobile video call between UEs each having a camera and a display. The method includes, upon receiving from an opposing UE, video transmission control information including therein a preferred image format, determining whether the preferred image format requested by the opposing UE is acceptable; and sending, to the opposing UE, video transmission control information including therein at least one of an acceptable response message and an acceptable new preferred image format according to acceptability of the preferred image format requested by the opposing UE.

According to another exemplary aspect of the present invention, there is provided an apparatus for determining a preferred image format in a User Equipment (UE) supporting a mobile video call between UEs each having a camera and a display. The apparatus includes a controller for determining an image format by exchanging preferred image format information with an opposing UE to which it will make the mobile video call; a video encoder for encoding an image signal received from the camera in the particular image format determined by the controller, and sending the encoded image signal to an opposing UE; and an image decoder for decoding an encoded image signal received from the opposing UE, adjusting the decoded image signal to the particular image format determined by the controller, and outputting the format-adjusted image signal to the display.

BRIEF DESCRIPTION OF THE DRAWINGS

The above and other exemplary aspects, features and advantages of the present invention will become more apparent from the following detailed description when taken in conjunction with the accompanying drawings in which.

DETAILED DESCRIPTION

Preferred exemplary embodiments of the present invention will be described herein below in detail, with reference to the annexed drawings. In the following description, a detailed description of known functions and configurations incorporated herein may be omitted for clarity and conciseness when their inclusion may obscure appreciation of the subject matter of the present invention by a person of ordinary skill in the art. Terms used herein are defined based on functions in the present invention and may vary according to users, operators' intention or usual practices. Therefore, the definition of the terms should be made based on contents throughout the specification.

The present invention provides a method in which in an SIP/SDP-based negotiation process between two UEs, one UE sends its desired image format along with an SDP offer, and upon receiving the SDP offer, an opposing UE accepts the SDP offer taking into account capabilities of its video encoder and camera, or if unacceptable, suggests (offers) its supportable preferred image format condition back to the other party, thereby negotiating the image format between UEs. That is, while the conventional art exchanges information indicating acceptability of only the maximum image format information, the present invention offers, to the opposing UE, not only the maximum image format information but also the actually-desired correct image format.

Figure 4:
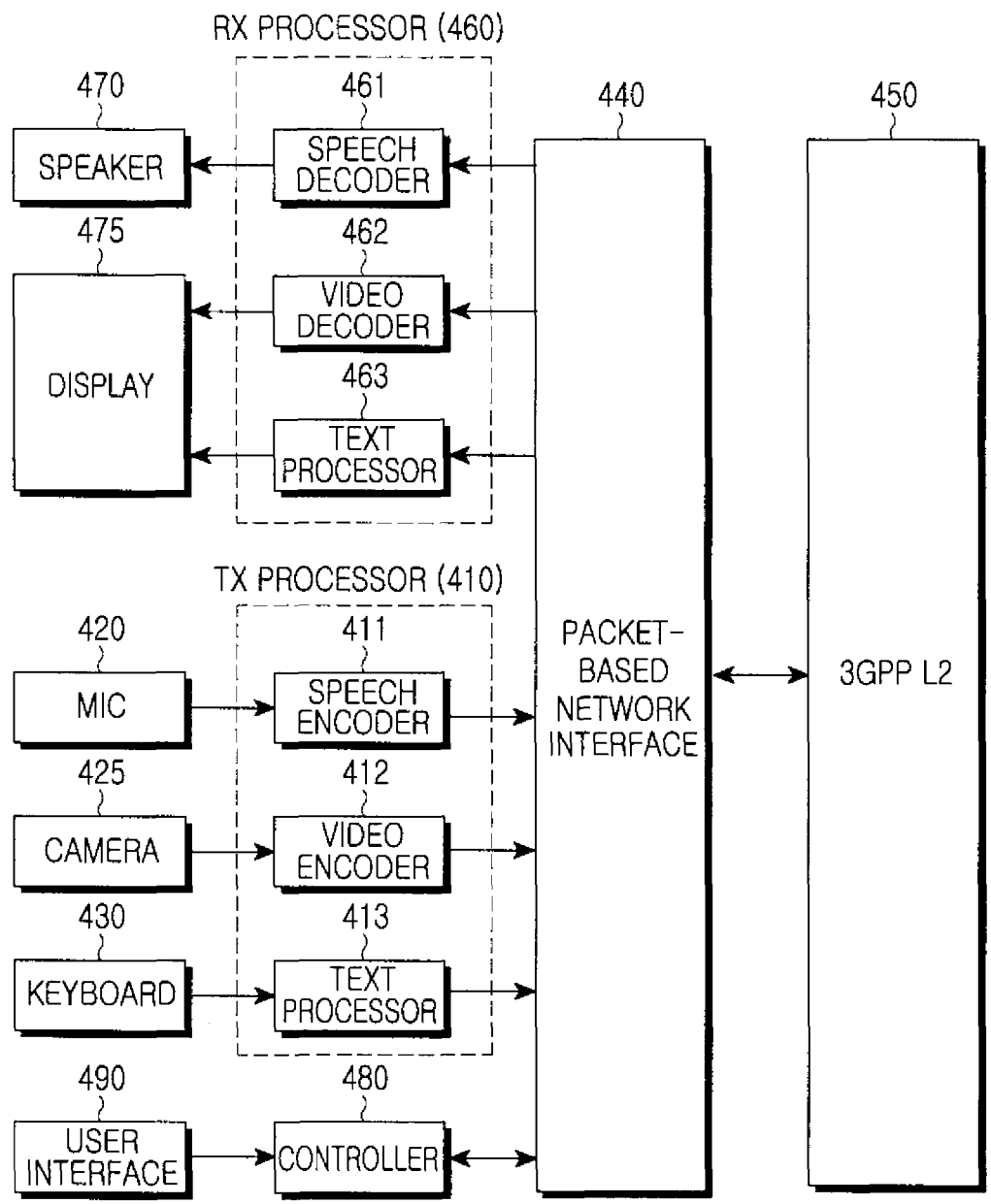
FIG. 4 is a block diagram illustrating an internal structure of a mobile video telephone according to an example of the present invention.

With reference to FIG. 4, a description will now be made of one exemplary internal structure of a UE (or IP-based packet-switched mobile video telephone) for implementing the above-stated method of the present invention.

Referring to FIG. 4, the UE is roughly composed of a transmission processor 410 and a reception processor 460 for bidirectional communication. In the transmission processor 410, voice and image, which have passed through a microphone 420 and a camera 425, are encoded in a speech encoder 411 and a video encoder 412, respectively, and headers of various protocols such as RTP, UDP and IP, together with the text received through a keyboard 430 and a text processor 413, are attached thereto in a packet-based network interface 440, and then transferred to a Layer 2 (L2) 450 of a 3$^{rd}$ Generation Project Partner (3GPP) network.

In the reception processor 460 shown in FIG. 4, the packet-based network interface 440 detaches headers of various protocols such as RTP, UDP and IP from the received encoded image, voice and text information, and transfers the header-detached image, voice and text to a speech decoder 461, a video decoder 462 and a text processor 463, respectively, and the decoded image and voice are transferred to a speaker 470 and a display 475 after synchronized.

A controller (Session Setup and Control) 480 controls call start/end according to user input information provided through a user interface 490. In addition, the controller 480 generates and outputs an SDP offer. While the conventional art designates type, profile and level of a desired video encoder in the SDP offer, the present invention adds the following commands to a description of each video encoder in the SDP offer.

a=rtpmap:99 H263-2000/90000
a=fmtp:99 profile=0; level=50
a=image_format: a b

The added commands of the SDP offer results in that although a UE sends to an opposing UE a request for an H.263 video encoder that can encode an image of up to the maximum CIF, a detailed size of the actually-desired image format is a pixels in horizontal and b pixels in vertical. The preferred image format (a, b) should be smaller than or equal to the maximum image format (352, 288). In order to reduce the image format determination time, multiple preferred image formats can be requested for one video encoder.

A description will now be made of an exemplary method for determining an image format in the above-stated UE according to the present invention. The present invention determines, for example, the image format in the video call initialization process shown in FIG. 1, and since the overall initialization process of the present invention is equal to FIG. 1, a description of the present invention will be made with reference to FIG. 1.

Figure 1:
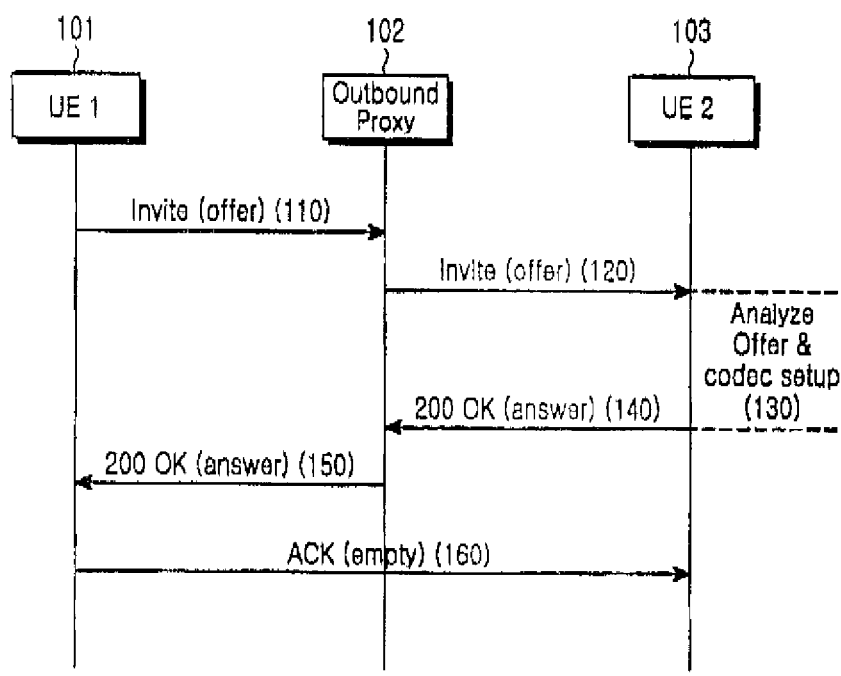
FIG. 1 is a signaling diagram illustrating a conventional video call initialization process between UEs.
Figure 2:
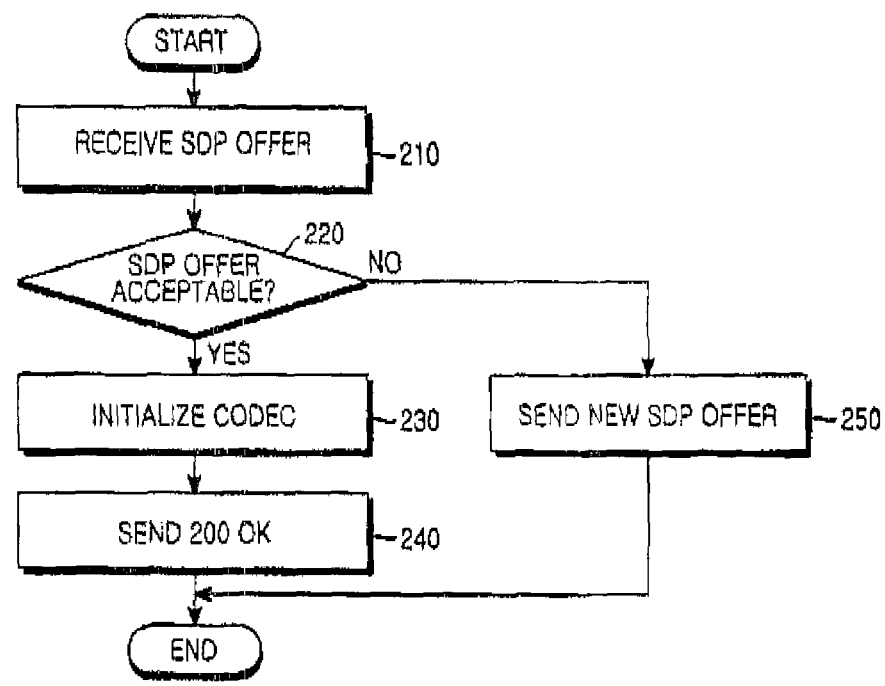
FIG. 2 is a flowchart illustrating an operation of a UE2, given for a detailed description of step 130 of FIG. 1.
Figure 3:
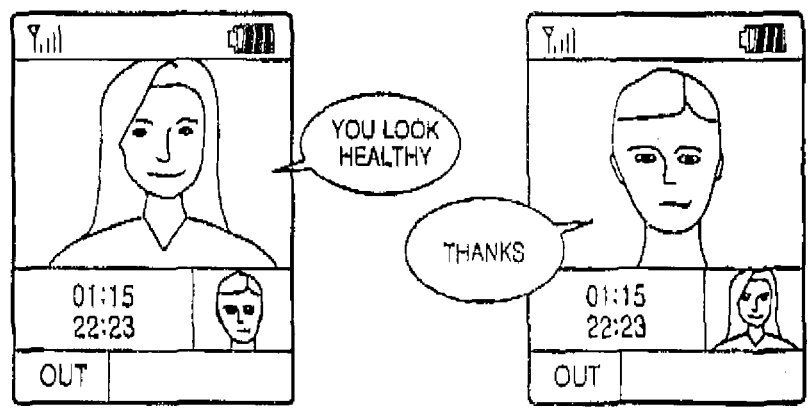
FIG. 3 is a diagram illustrating displays on which a video call is made according to the prior art.

In the present invention, unlike in the conventional art, in that when the UE1 101 performs step 110 of FIG. 1, there is additionally included the added commands for a preferred image format (a, b) in a transmission SDP offer, and sending of the SDP offer to the UE2 103. Then, in step 130, the UE2 103 analyzes the received SDP offer with added commands, to determine an image format. A detailed description of the analysis operation of the UE2 103 according to an example of the present invention will now be given below with reference to FIG. 5.

Figure 5:
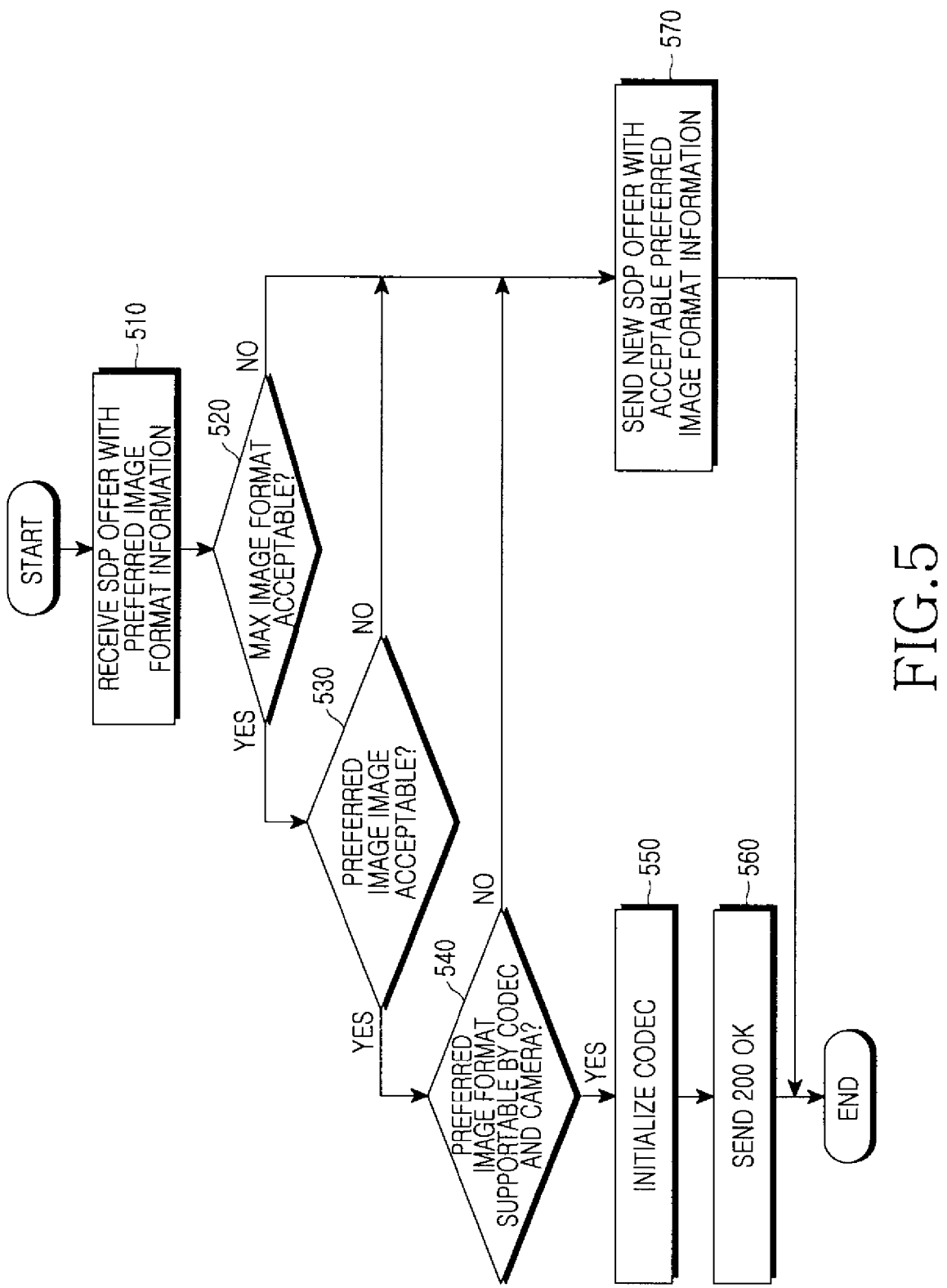
FIG. 5 is a flowchart illustrating a preferred image format determination method of a UE according to an example of the present invention.

Referring to the exemplary flowchart in FIG. 5, the UE2 checks the received SDP offer in step 510, and determines in step 520 whether the SDP offer is acceptable. That is, the UE2 determines if it can accept the maximum image format included in the SDP offer. If it is determined in step 520 that the UE2 is capable of accepting the maximum image format, the UE2 analyzes in step 530 a preferred image format command (a=image_format: a b) received along with the SDP offer to determine whether it can support the image format indicated by the preferred image format (a, b) along with the maximum image format having the agreed profile and level.

If it is determined in step 530 that the requested preferred image format is acceptable, the UE2 then checks in step 540 if its video encoder and camera can support the preferred image format. If it is checked in step 540 that the video encoder and camera can support the requested preferred image format, the UE2 initializes the video encoder in step 550, and sends in step 560 a response signal (200 OK) indicating an acceptance of the received SDP offer, to the opposing UE1 that sent the SDP offer.

However, if it is determined in steps 520 to 540 that the UE2 cannot accept the SDP offer, the UE2 generates an acceptable SDP offer and sends it to the opposing UE1, and the SDP offer includes therein not only the acceptable maximum image format but also the preferred image format information.

Although not shown in the drawings, upon receiving the 200 OK message from the UE2 103, the UE1 101 starts a video call transmitted in the preferred image format. However, upon receiving a new SDP offer message, the UE1 101 performs the same operation as in steps 510 to 570, thereby performing a preferred image format determination process with the UE2 103. Thereafter, an inter-UE video call is started according to the image format determined through the above-stated negotiation process.

As is apparent from the foregoing description, the present invention provides an encoding of the image in the format which is closest, if possible, to the image having the format desired by the user while utilizing the intact existing signaling system. In addition, the present invention makes the best use of the limited bit rate, thereby maximizing the image quality of the mobile video telephone. Further, the present invention can reduce the delay and power consumption caused by calculation for image size adjustment.

While the invention has been shown and described with reference to a certain preferred exemplary embodiment thereof, it will be understood by those skilled in the art that various changes in form and details may be made therein without departing from the spirit of the invention and the scope of the appended claims.

What is claimed is:

1. A method for determining a preferred image format in a User Equipment (UE) supporting a video call, the method comprising:
    receiving, from an opposing UE, a Session Description Protocol (SDP) message including the preferred image format in which is smaller than or equal to a first maximum image format of the opposing UE,
    determining whether the preferred image format requested by the opposing UE is an acceptable format; and
    sending, to the opposing UE, a video transmission control information including an response message when the preferred image format requested by the opposing UE is an acceptable format and a SDP message including a second maximum image format and preferred image format information when the preferred image format requested by the opposing UE is not an acceptable format.

2. The method of claim 1, wherein the preferred image format comprises more than two in number.

3. The method of claim 1, wherein the preferred image format comprises a detailed size (a,b) of a pixels in horizontal and b pixels in vertical.

4. The method of claim 1,
    wherein determining whether the preferred image format is acceptable comprises:
    (i) determining whether the first maximum image format included in the received SDP message from the opposing UE can be accepted;
    (ii) determining whether the preferred image format included in the received SDP message from the opposing UE is supportable in the first maximum image format; and
    (iii) determining whether a video encoder and a camera support the preferred image format.

5. The method of claim 1, wherein the preferred image format is determined adaptively according to performance of the opposing UE.

6. The method of claim 1, wherein the preferred image format is not predetermined image format between the opposing UE and the UE, but an arbitrary image format determined at the opposing UE.

7. The method of claim 1, wherein the opposing UE does not implement a rescaling after receiving data that is sent in the preferred image format from the UE,
wherein the preferred image format is equal to image format to display on the opposing UE.

8. The method of claim 1, wherein the preferred image format is the fittest image format of the opposing UE when the preferred image format is not equal to image format to display on the opposing UE.

9. An apparatus for determining a preferred image format in a User Equipment (UE) supporting a video call, the apparatus comprising:
a controller for determining an image format by exchanging a Session Description Protocol (SDP) message including preferred image format information with an opposing UE for the video call;
a video encoder for encoding an image signal received from a camera in a particular image format determined by the controller, and sending the encoded image signal to an opposing UE; and
an image decoder for decoding an encoded image signal received from the opposing UE, adjusting the decoded image signal to the particular image format determined by the controller, and outputting the format-adjusted image signal to a display;
wherein the controller generates the preferred image format of the UE, and generates—a video transmission control information including a response message when the preferred image format of the opposing UE included in a SDP message received from the opposing UE is an acceptable format and a new SDP message including a second maximum image format and preferred image format information when the preferred image format of the opposing UE included in the SDP message received from the opposing UE is not an acceptable format,
wherein the preferred image format included in the SDP message received from the opposing UE is smaller than or equal to a first maximum image format of the opposing UE.

10. The apparatus of claim 9,
wherein the controller determines whether to accept the first maximum image format included in the received SDP message from the opposing UE and determines whether the preferred image format included in the received SDP message from the opposing UE is supportable in the maximum image format, and determines whether a video encoder and a camera support the preferred image format.

11. The apparatus of claim 9, wherein the preferred image format is comprises more than two in number.

12. The apparatus of claim 9, wherein a detailed size (a,b) of the preferred image format comprises a pixels in horizontal and b pixels in vertical.

13. The apparatus of claim 9, wherein the preferred image format included in the SDP message received from the opposing UE is determined adaptively according to performance of the opposing UE.

14. The apparatus of claim 9, wherein the preferred image format of the UE is not predetermined image format between the opposing UE and the UE, but an arbitrary image format determined at the UE.

15. The apparatus of claim 9, wherein the UE does not implement a rescaling after receiving data that is sent in the preferred image format of the UE from the opposing UE,
wherein the preferred image format of the UE is equal to image format to display on the UE.

16. The apparatus of claim 9, wherein the preferred image format of UE is the fittest image format of the UE when the preferred image format of UE is not equal to image format to display on the UE.

17. A method for determining a preferred image format in a User Equipment (UE) supporting a video call, the method comprising:
sending to an opposing UE a Session Description Protocol (SDP) message including the preferred image format in which is smaller than or equal to a first maximum image format,
receiving from the opposing UE a video transmission control information including an response message when the preferred image format is an acceptable format in the opposing UE and a new SDP message including a second maximum image format and preferred image format information when the preferred image format is not an acceptable format in the opposing UE.

18. The method of claim 17, wherein the preferred image format is determined adaptively according to performance of the UE.

19. The method of claim 17, wherein the preferred image format is not predetermined image format between the opposing UE and the UE, but an arbitrary image format determined at the UE.

20. The method of claim 17, wherein the UE does not implement a rescaling after receiving data that is sent in the preferred image format from the opposing UE,
wherein the preferred image format is equal to image format to display on the UE.

21. The method of claim 17, wherein the preferred image format is the fittest image format of the UE when the preferred image format is not equal to image format to display on the UE.

* * * * *